(12) United States Patent
Hung et al.

(10) Patent No.: US 11,628,320 B2
(45) Date of Patent: Apr. 18, 2023

(54) FALL ARREST CONNECTOR

(71) Applicant: YOKE INDUSTRIAL CORP., Taichung (TW)

(72) Inventors: Wei-Chieh Hung, Taichung (TW); Wei-Chih Chen, Chiayi (TW); Tzu-Lun Weng, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 196 days.

(21) Appl. No.: 17/157,380

(22) Filed: Jan. 25, 2021

(65) Prior Publication Data

US 2022/0233897 A1 Jul. 28, 2022

(51) Int. Cl.
*A62B 35/04* (2006.01)
*A62B 35/00* (2006.01)

(52) U.S. Cl.
CPC .......... *A62B 35/04* (2013.01); *A62B 35/0037* (2013.01)

(58) Field of Classification Search
CPC ............................ A62B 35/04; A62B 35/0037
See application file for complete search history.

(56) References Cited

U.S. PATENT DOCUMENTS

| | | | |
|---|---|---|---|
| 8,584,799 B1 * | 11/2013 | Dennington | A62B 35/04 182/4 |
| 2009/0071750 A1 * | 3/2009 | Simard | A62B 35/0075 182/5 |
| 2019/0070444 A1 * | 3/2019 | Seman | A62B 35/0037 |
| 2019/0083825 A1 * | 3/2019 | Huseth | A62B 35/0037 |

FOREIGN PATENT DOCUMENTS

| | | |
|---|---|---|
| CN | 210554660 U | 5/2020 |
| CN | 215136184 U | 12/2021 |
| JP | 2001198232 A | 7/2001 |
| JP | 2003070926 A | 3/2003 |
| RU | 2016596 C1 | 7/1994 |

OTHER PUBLICATIONS

Search Report for CN202011540574X, dated Sep. 13, 2022, Total of 2 pages.
Translation of Abstract of JP2001198232, Total of 1 page.
Translation of Abstract of JP2003070926, Total of 1 page.
Translation of Abstract of CN215136184, Total of 1 page.
Translation of Abstract of CN210554660, Total of 1 page.

* cited by examiner

*Primary Examiner* — Robert Sandy
*Assistant Examiner* — Rowland Do
(74) *Attorney, Agent, or Firm* — Apex Juris, PLLC; Tracy Heims; Hilde Coeckx (57) ABSTRACT

A fall arrest connector is used to connect at least a safety belt with a snap hook and a wearable harness for a user to wear. The fall arrest connector includes a retaining ring, a buckle ring, and a breakable connection. The retaining ring, including the first connecting portion, is connected to the wearable harness. The buckle ring, including the second connecting portion, is hooked by the snap hook. The breakable connection connects the second connecting portion and the first connecting portion. When the retaining ring or the buckle ring is pulled by a predetermined external force, the breakable connection is broken to separate the first and the second connecting portion. The retaining ring and the buckle ring could respectively be connected to the substitute protection device, which could provide the user an instant protection when the first connecting portion and the second connecting portion are separated.

5 Claims, 10 Drawing Sheets

FALL ARREST CONNECTOR

BACKGROUND OF THE INVENTION

Technical Field

The present invention relates generally to a fall arrest connector.

Description of Related Art

According to safety regulations in the workplace, when a worker works at height, necessary protection should be provided to avoid and to prevent an accident, such as by using a conventional safety belt. Typically, two ends of a conventional safety belt are respectively fixed to a support and a snap hook of the wearable harness worn by a user. When the user accidentally falls, the wearable harness and the safety belt could arrest the user to prevent the user from injury or death due to falling from height.

However, most of the conventional safety belts include a strap or a lanyard with a certain length to directly connect the user and the support, and no energy absorbing device is connected between the user and the support. Therefore, when the user falls from height, the user is usually injured badly because of the arrest force generated during fall arrest.

Additionally, a connecter for the conventional safety belt is easily disengaged from the wearable harness due to careless operation and is hard to return to a lock position, so that it is very inconvenient for the user working at height.

Moreover, when the conventional connector is disengaged from the wearable harness due to careless operation, an accident of falling from height could happen to the user at any time. At that time, no substitute protection device could protect the user.

In view of above, a new fall arrest connector is needed to improve the energy absorbing capability of the connector of the conventional safety belt, thereby prevent the user from being severely injured due to the arrest force. The problem that the conventional safety belt is easily disengaging from the wearable harness due to careless operation should be solved as well, and the substitute protection measure is included for providing a better protection of the user.

BRIEF SUMMARY OF THE INVENTION

In view of the above, the primary objective of the present invention is to provide a fall arrest connector, which could solve the problem that a user is injured severely by a conventional safety belt without any energy absorbing design—especially when the connector is directly connected to the safety belt. Additionally, the fall arrest connector could solve the problem that the conventional safety belt is easily disengaging from the wearable harness due to careless operation, and the substitute protection measure is provided for giving a better protection to the user.

The present invention provides a fall arrest connector which is adapted to connect at least a safety belt and a wearable harness, wherein the safety belt is disposed with a snap hook, and the wearable harness is for wearing by a user. The fall arrest connector includes a retaining ring, a buckle ring, and a breakable connection. The retaining ring is adapted to be connected to the wearable harness and includes a first connecting portion. The buckle ring is adapted to be hooked by the snap hook and includes a second connecting portion. The breakable connection connects the second connecting portion and the first connecting portion. When the retaining ring, the buckle ring, or a combination thereof is pulled by a predetermined external force, the breakable connection is broken to allow the first connecting portion and the second connecting portion to separate apart from each other.

With the aforementioned design, the retaining ring and the buckle ring of the fall arrest connector could be respectively connected to the substitute protection device, so that when the first connecting portion and the second connecting portion are separated from each other, the substitute protection device could provide an instant protection to the user. The retaining ring and the buckle ring of the fall arrest connector are respectively connected to the two ends of the shock absorber strap of the energy-absorbing package, wherein the retaining ring is directly connected to the wearable harness of the user, and the buckle ring is directly connected to the safety belt. Therefore, when the first connecting portion and the second connecting portion are separated from each other, the energy-absorbing package could absorb the arrest force immediately to prevent the user from being injured during fall arrest, thereby providing a better protection.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
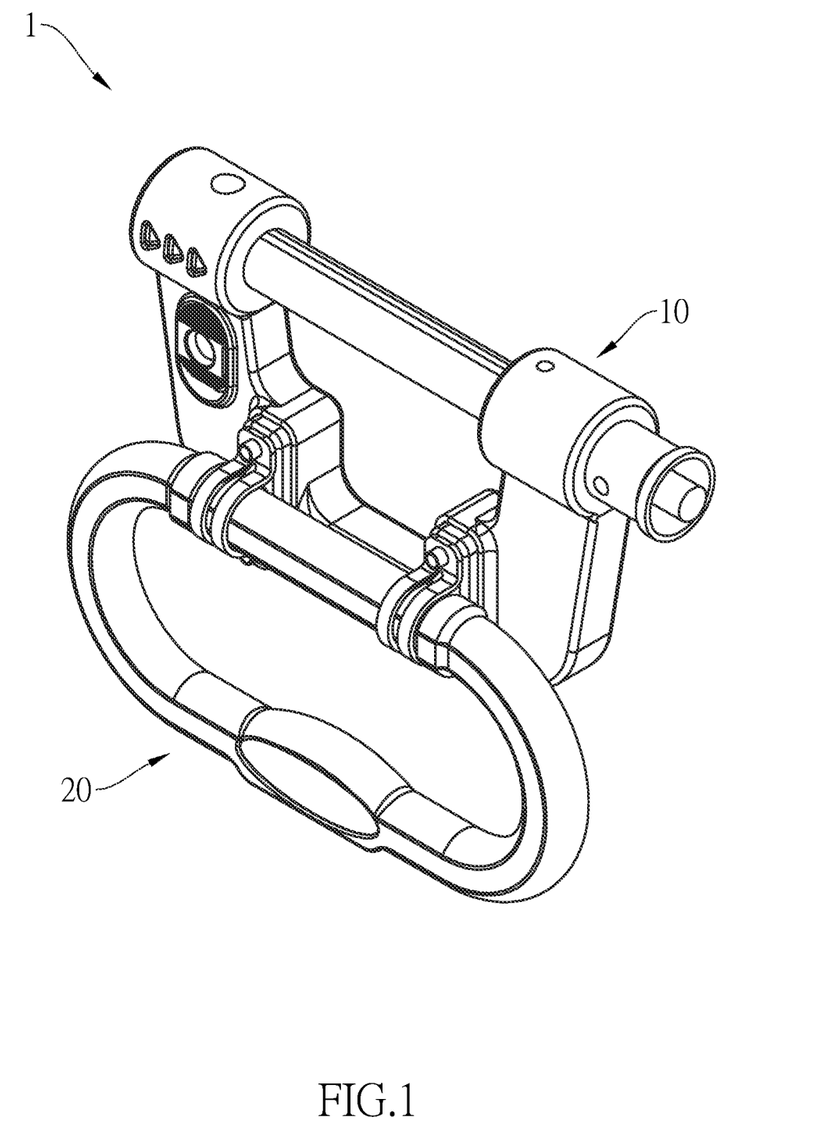
FIG. 1 is a perspective view of the fall arrest connector of an embodiment according to the present invention.
Figure 2:
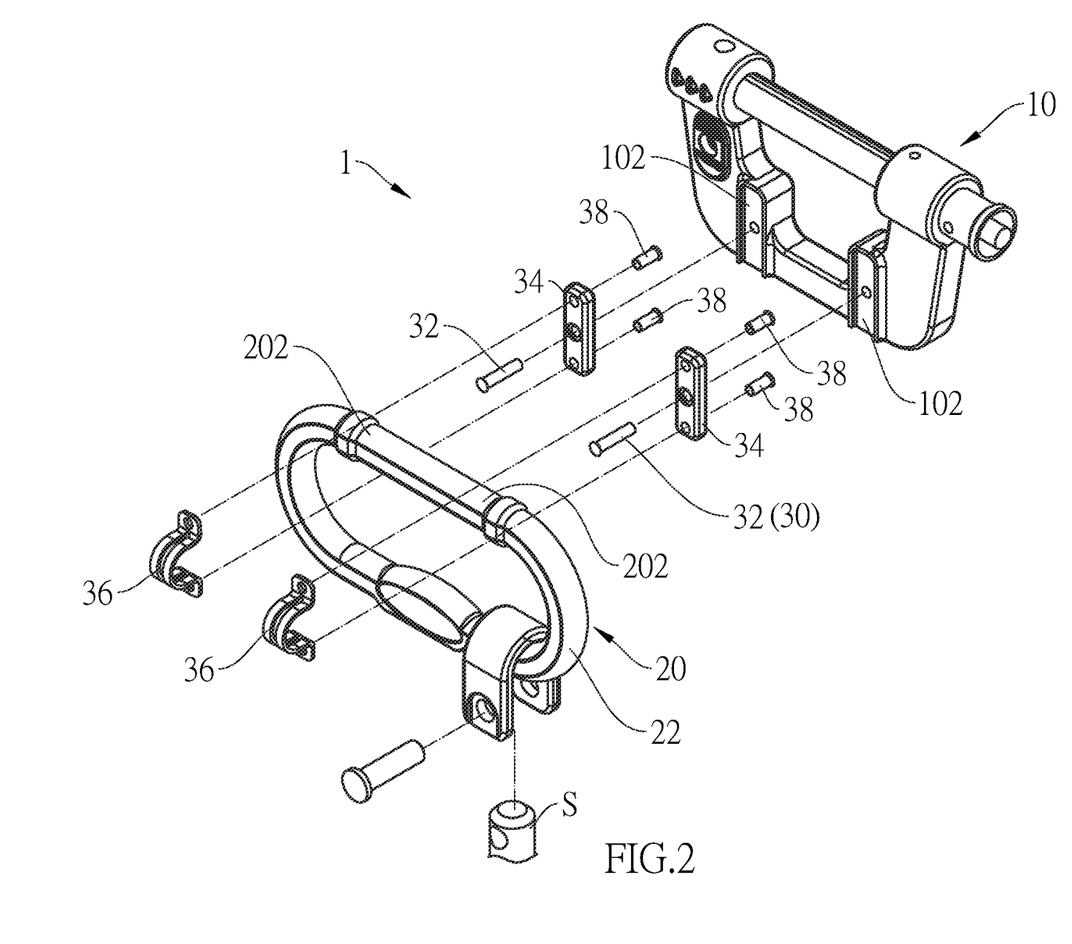
FIG. 2 is an exploded view of the fall arrest connector shown in FIG. 1.
Figure 3A:
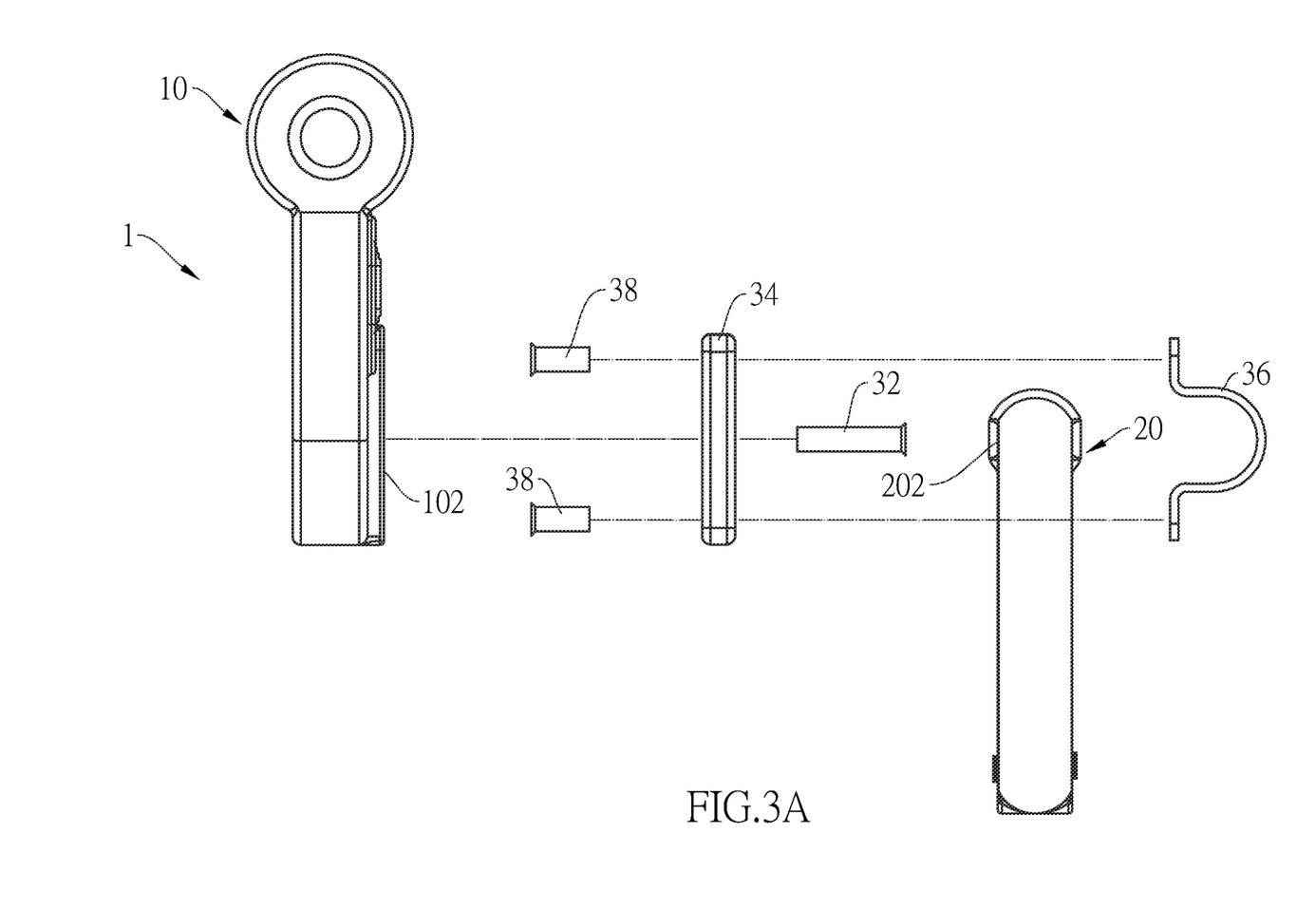
FIG. 3A is a side view of the exploded view of the fall arrest connector shown in FIG. 2.
Figure 3B:
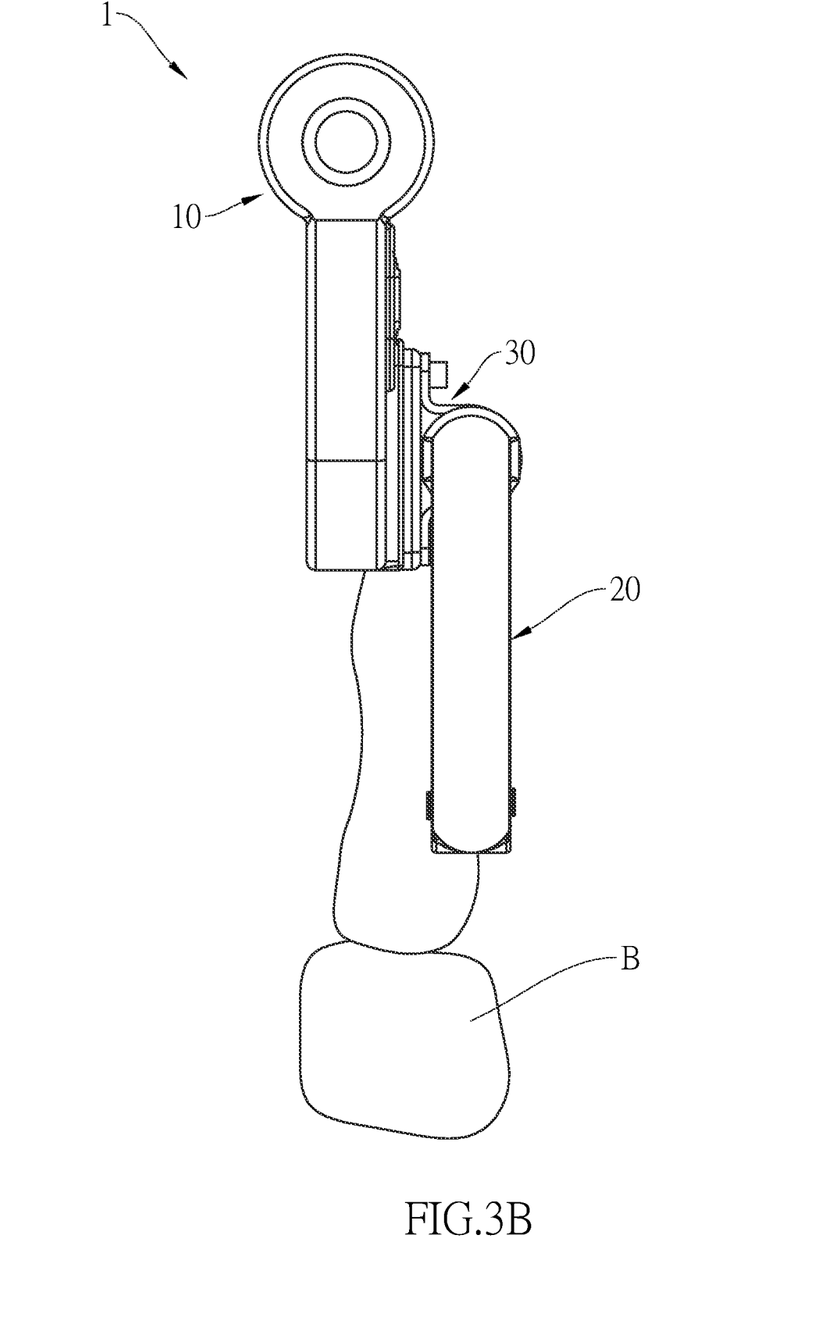
FIG. 3B is a side view of the fall arrest connector with the energy-absorbing package attached.

Referring to FIG. 1 to FIG. 3B, FIG. 1 is a perspective view of a fall arrest connector 1 of an embodiment according to the present invention; FIG. 2 is an exploded view of the fall arrest connector 1 shown in FIG. 1; FIG. 3A is a side view of the exploded fall arrest connector 1 shown in FIG. 2; FIG. 3B is a side view of the fall arrest connector 1 with an energy-absorbing package B.

In FIG. 1 and FIG. 2, the fall arrest connector 1 is adapted to at least connect a safety belt and a wearable harness, wherein the safety belt is disposed with a snap hook S, and the wearable harness is for wearing by a user. The fall arrest connector 1 includes a retaining ring 10, a buckle ring 20, and a breakable connection 30.

The retaining ring 10 is adapted to be connected to the wearable harness and has a first connecting portion 102. The buckle ring 20 is for being hooked by the snap hook S and includes a second connecting portion 202. The breakable connection 30 connects the second connecting portion 202 and the first connecting portion 102. When the retaining ring 10, the buckle ring 20, or a combination thereof is pulled by a predetermined external force, the breakable connection 30 is broken to allow the first connecting portion 102 and the second connecting portion 202 to separate apart from each other.

As illustrated in FIG. 2 and FIG. 3A, the buckle ring 20 includes a ring body 22, at least one fixing block 34, and at least one fixing strap 36, wherein the at least one fixing block 34 and the at least one fixing strap 36 are taken as the second connecting portion 202. The breakable connection 30 is at least one connecting pin 32. The at least one fixing strap 36 and the at least one fixing block 34 are connected to form at least one ring, wherein the ring body 22 of the buckle ring 20 passes through the at least one ring, and the at least one connecting pin 32 passes through the at least one fixing block 34 of the second connecting portion 202 and is fixed to the first connecting portion 102. The buckle ring 20 of the second connecting portion 202 further includes at least one rivet 38, wherein by using at least one rivet 38 to fix the at least one fixing strap 36 and the at least one fixing block 34 to each other to form the at least one ring.

In FIG. 2 and FIG. 3A, a number of the fixing block 34 is two; a number of the fixing strap 36 is two, a number of the connecting pin 32 is two; and a number of the at least one rivet 38 is four. Each of the fixing straps 36 is fixed to one of the fixing blocks 34 to form the ring, wherein each of the fixing straps 36 could be fixed to one of the fixing blocks 34 by two of the rivets 38. Each of the connecting pin 32 is disposed between the two of the rivets 38 and is fixed to the first connecting portion 102 and the fixing block 34.

In an embodiment, a shear strength and a tensile strength of a material of the connecting pin 32 is smaller than a shear strength and a tensile strength of a material of the rivets 38. Therefore, when either one of the retaining ring 10 and the buckle ring 20 or both of them is pulled by the predetermined external force, the connecting pin 32 could be broken earlier than the rivets 38 to allow the first connecting portion 102 and the second connecting portion 202 to separate apart from each other.

The predetermined external force includes a shear force exerting between the first connecting portion 102 and the second connecting portion 202. The shear force can break the connecting pins 32 but cannot break the rivets 38.

In the current embodiment, the fall arrest connector 1 includes an energy-absorbing package B. The retaining ring 10 and the buckle ring 20 are respectively connected to two ends of the energy-absorbing package B, as shown in FIG. 3B. When the breakable connection 30 is broken by the predetermined external force to separate the first connecting portion 102 and the second connecting portion 202 apart, the retaining ring 10 and the buckle ring 20 of the fall arrest connector 1 of the current embodiment are respectively connected to a substitute protection device (i.e., energy-absorbing package B), and the substitute protection device could provide an instant protection to the user.

In the current embodiment, when the first connecting portion 102 and the second connecting portion 202 are separated apart from each other, the energy-absorbing package B is adapted to retard a rate of separation between the retaining ring 10 and the buckle ring 20. More specifically, the substitute protection device (i.e., energy-absorbing package B) includes a plurality of shock absorber straps, wherein each of the shock absorber straps is produced by folding a strap body in times to form a folded portion, and stitching, sewing, or knitting the folded portion to fix. When the shock absorber strap is pulled by the predetermined external force, the folded portion of the shock absorber straps might sequentially and slowly be broken at seams, thereby preventing the user from a danger caused by a direct fall or a sudden pull.

Figure 4:
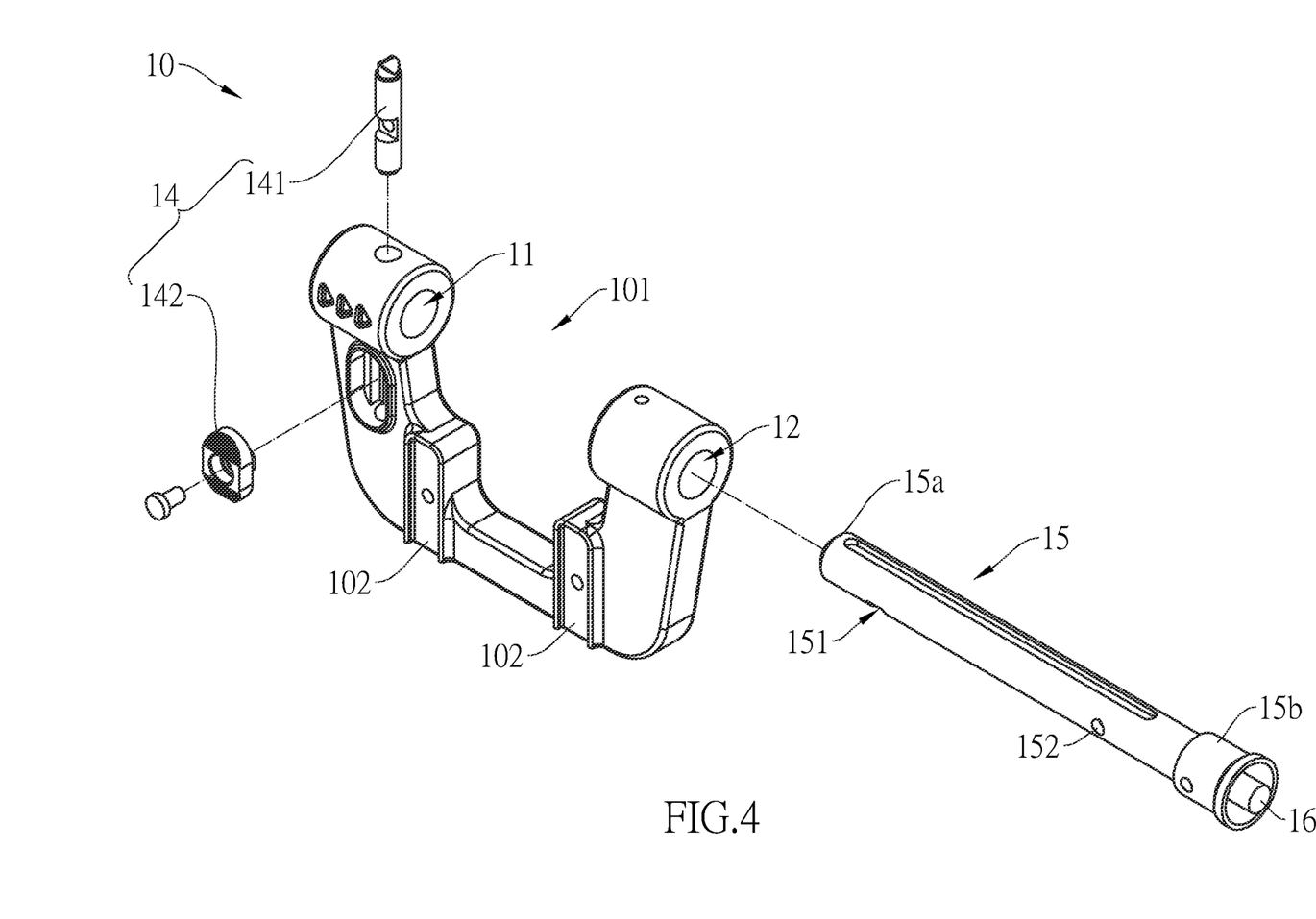
FIG. 4 is an exploded view of the retaining ring of the fall arrest connector of an embodiment according to the present invention.
Figure 5:
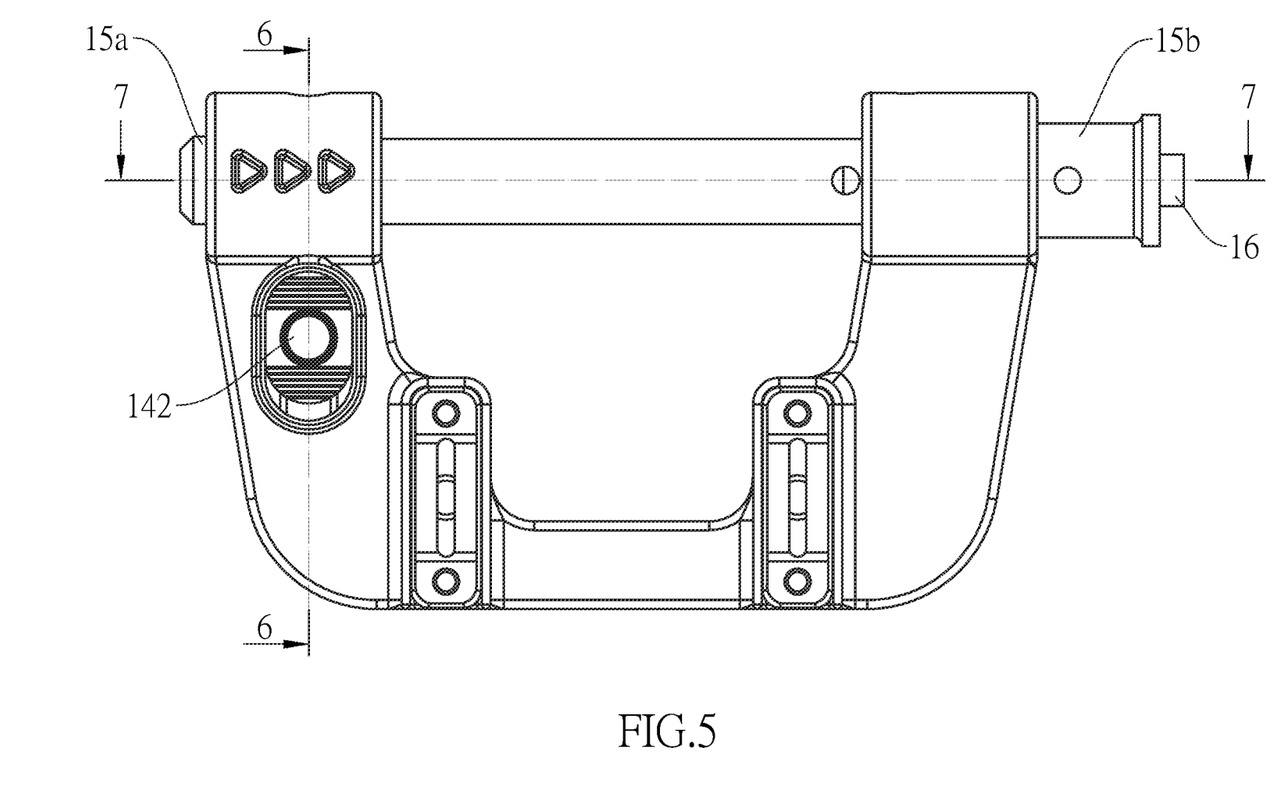
FIG. 5 is a front view of the retaining ring of the fall arrest connector of the embodiment according to the present invention.
Figure 6:
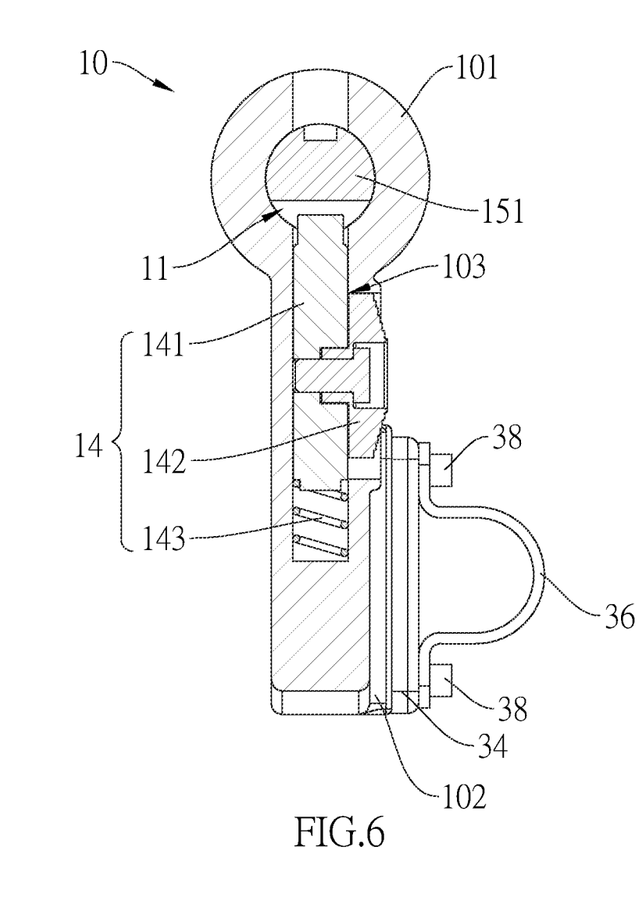
FIG. 6 is a sectional view taken along the 6-6 line in FIG. 5.
Figure 7:
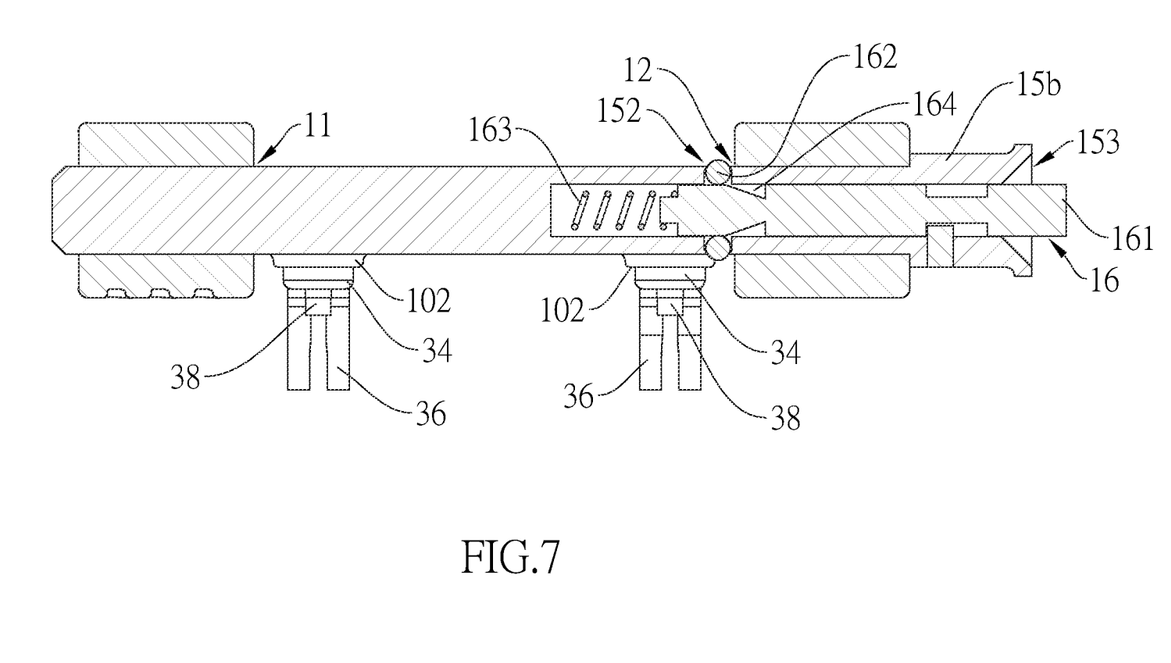
FIG. 7 is a sectional view taken along the 7-7 line in FIG. 5.
Figure 8:
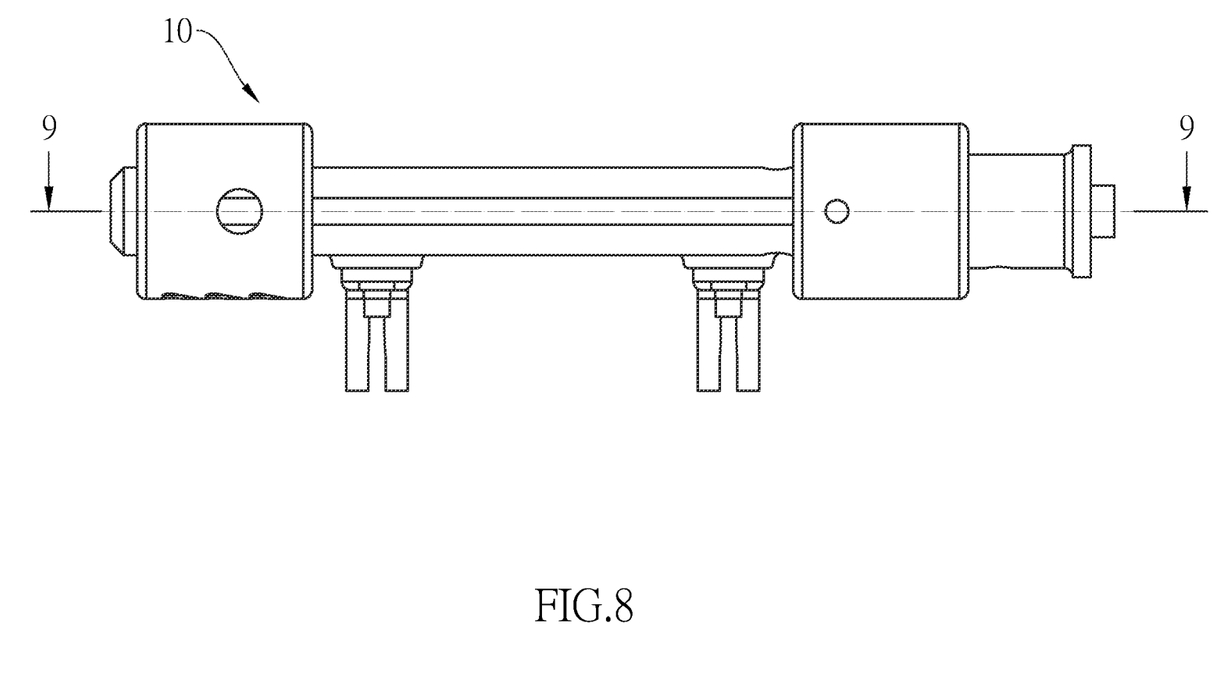
FIG. 8 is a top view of the retaining ring of the fall arrest connector according to the present invention.
Figure 9:
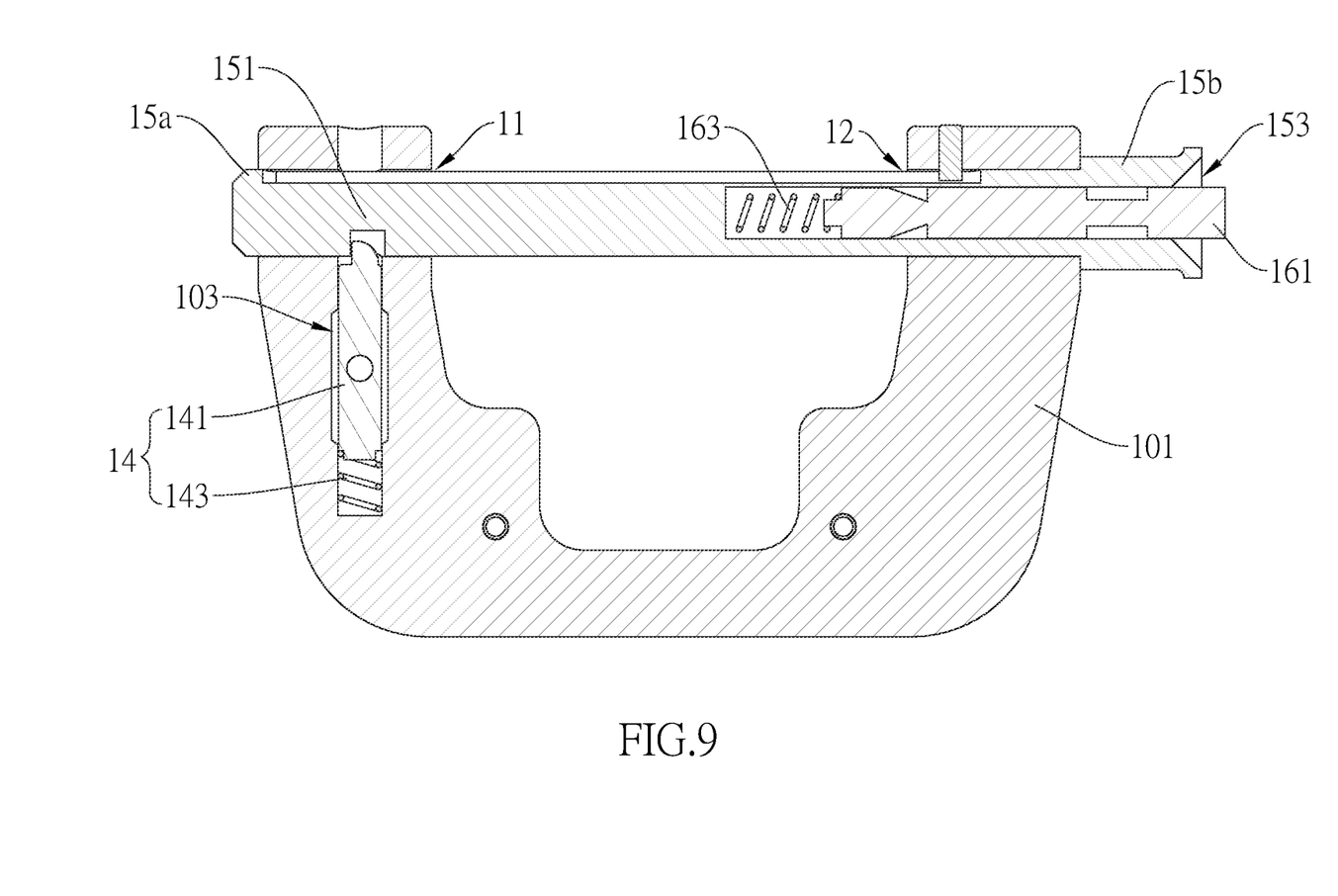
FIG. 9 is a sectional view taken along the 9-9 line in FIG. 8.

Next, referring to FIG. 4 to FIG. 9, FIG. 4 is an exploded view of the retaining ring 10 of the fall arrest connector 1 of an embodiment according to the present invention; FIG. 5 is a front view of the retaining ring 10 of the fall arrest connector 1 of the embodiment according to the present invention; FIG. 6 is a sectional view taken along the 6-6 line in FIG. 5; FIG. 7 is a sectional view taken along the 7-7 line in FIG. 5; FIG. 8 is a top view of the retaining ring 10 of the fall arrest connector 1 according to the present invention; and FIG. 9 is a sectional view taken along the 9-9 line in FIG. 8.

The retaining ring 10 includes a main body 101, a locking pin 15, a first locking member 14, and a second locking member 16.

The main body 101 is adapted to be connected to the wearable harness and has a first perforation 11 and a second perforation 12.

The locking pin 15 is adapted to be hooked by a loop or a snap hook of the wearable harness. The locking pin 15 has a first fixing portion 151 located at a first end portion 15a of the locking pin 15 and a second fixing portion 152 located between the first end portion 15a and a second end portion 15b of the locking pin 15, wherein the first end portion 15a is opposite to the second end portion 15b. The second fixing portion 152 is closer to the second end portion 15b of the locking pin 15 than the first end portion 15a.

When the first end portion 15a of the locking pin 15 passes through the second perforation 12 of the main body 101, the locking pin 15 could be operated to move relative to the main body 101 between an open position and a closed position. When the first end portion 15a of the locking pin 15 is inserted into the first perforation 11 of the main body 101, the locking pin 15 is located at the closed position relative to the main body 10. At this time, the first fixing portion 151 of the locking pin 15 is located in the first perforation 11, and the second fixing portion 152 is right beside the second perforation 12.

The first locking member 14 is disposed nearby the first perforation 11 of the main body 101 and could be operated to move relative to the main body 101 between a first position and a second position. When the first locking member 14 is located in the first position to be engaged with the first fixing portion 151 located in the first perforation 11, the locking pin 15 is restricted in the closed position.

The second locking member 16 passes through the second end portion 15b of the locking pin 15 and could be operated to move between a third position and a fourth position in the locking pin 15. When the second locking member 16 is located in the third position and the second end portion 15b is passed through the second perforation 12, the locking pin 15 is restricted in the closed position.

As illustrated in FIG. 4 to FIG. 9, the main body 101 further includes a receiving groove 103 which communicates with the first perforation 11. The first locking member 14 is located in the receiving groove 103 and includes a dowel pin 141, a controlling member 142, and an elastic member 143. The elastic member 143 is disposed in a bottom portion of the receiving groove 103 and urges the dowel pin 141 to make the dowel pin 141 protrude into the first perforation 11.

The controlling member 142 is connected to the dowel pin 141 and is used to control the dowel pin 141 to move between the first position and the second position. When the dowel pin 141 is located in the first position to restrict the first fixing portion 151 to be located in the first perforation 11, the dowel pin 141 restricts the locking pin 15 to stay in the closed position. On contrary, when the dowel pin 141 is located in the second position, the dowel pin 141 does not restrict the locking pin 15 to stay in the closed position. In an embodiment, the dowel pin 141 in the first position could be engaged with or protrudes into the first fixing portion 151 to restrict the locking pin 15 in the closed position; the dowel pin 141 in the second position is disengaged from the first fixing portion 151, so that the locking pin 15 does not be restricted in the closed position.

The locking pin 15 further includes a receiving cavity 153 communicates with the second fixing portion 152. The second locking member 16 includes a controlling pin 161, a positioning block 162, and an elastic member 163, wherein the controlling pin 161, the positioning block 162, and the elastic member 143 are disposed in the receiving cavity 153. The controlling pin 161 could be operatably moved along a longitudinal direction of the locking pin 15. The elastic member 163 is disposed at a bottom portion of the receiving cavity 153 and urges the controlling pin 161 in a direction away from the bottom portion of the receiving cavity 153.

The positioning block 162 is disposed in the second fixing portion 152 and could protrude out of the second fixing portion 152 by being urged by the controlling pin 161. When the controlling pin 161 is located in the third position, and the second fixing portion 152 is located between the first perforation 11 and the second perforation 12, the positioning block 162 protrude out of the second fixing portion 152 to restrict the locking pin 151 to be located in the closed position. On contrary, when the controlling pin 161 is located in the fourth position, the positioning block 162 falls into the recess 164 of the controlling pin 161 and does not protrude out of the second fixing portion 152, so that the locking pin 15 is not restricted in the closed position.

In view of above, when the first locking member 14 is located in the first position and the second locking member 16 is located in the third position, the locking pin 151 could be freely moved between the open position and the closed position. When either the first locking member 14 is located at the first position or the second locking member 16 is located in the third portion, the locking pin 151 could not be freely moved between the open position and the closed position.

Only when the first locking member 14 is located in the second position and the second locking member 16 is located in the fourth position, the locking pin 151 could be freely moved between the open position and the closed position, thereby providing a double-locking protection to avoid the wearable harness disengaging from the conventional safety belt connector easily due to careless operation.

With such design, the fall arrest connector of the embodiment according to the present invention provides the retaining ring and the buckle ring which are respectively connected to the substitute protection device. When the first connecting portion and the second connecting portion are separated from each other, the substitute protection device could provide the instant protection to the user. In the current embodiment, the retaining ring and the buckle ring of the fall arrest connector are respectively connected to the two ends of the shock absorber strap, wherein the retaining ring is directly connected to the wearable harness of the user, and the buckle ring is directly connected to the safety belt. Therefore, when the first connecting portion and the second connecting portion are separated, the energy-absorbing package absorbs the arrest force to avoid the user being badly injured during fall arrest, thereby providing a safer protection. Additionally, the retaining ring of the fall arrest connector provides the double-locking protection to avoid the wearable harness which is disengaged from the conventional safety belt connecter due to careless operation.

It must be pointed out that the embodiment described above is only a preferred embodiment of the present invention. All equivalent structures which employ the concepts disclosed in this specification and the appended claims should fall within the scope of the present invention.

What is claimed is:

1. A fall arrest connector adapted to connect at least a safety belt and a wearable harness, wherein the safety belt is disposed with a snap hook, and the wearable harness is for wearing by a user; the fall arrest connector comprising:
    a retaining ring adapted to be connected to the wearable harness and including a first connecting portion;
    a buckle ring adapted to be hooked by the snap hook and including a second connecting portion; and
    a breakable connection connecting the second connecting portion and the first connecting portion; when the retaining ring, the buckle ring, or a combination thereof is pulled by a predetermined external force, the breakable connection is broken to allow the first connecting portion and the second connecting portion to separate apart from each other; and
    wherein the buckle ring includes a ring body, a fixing block, and a fixing strap, and the fixing block and the fixing strap are taken as the second connecting portion; the breakable connection is a connecting pin; the fixing strap and the fixing block are connected to form a ring, wherein the ring body of the buckle ring passes through the at least one ring, and the connecting pin passes through the fixing block of the second connecting portion and is fixed to the first connecting portion.

2. The fall arrest connector as claimed in claim 1, wherein the buckle ring further comprises at least one rivet; the fixing strap is fixed to the fixing block via the at least one rivet.

3. The fall arrest connector as claimed in claim 2, wherein a shear strength and a tensile strength of a material of the connecting pin is smaller than that of the at least one rivet; when at least one of the retaining ring and the buckle ring is pulled by the predetermined external force, comparing to the at least one rivet, the connecting pin could be broken first by the predetermined external force to allow the first connecting portion and the second connecting portion to separate apart from each other.

4. The fall arrest connector as claimed in claim 2, wherein a number of the fixing block is two; a number of the fixing strap is two, a number of the connecting pin is two; and a number of the at least one rivet is four; each of the fixing straps is fixed to one of the fixing blocks to form the ring, wherein each of the fixing straps is fixed to one of the fixing blocks by two of the rivets; each of the connecting pins is disposed between the two of the rivets and is fixed to the first connecting portion and the fixing block.

5. The fall arrest connector as claimed in claim 1, further comprising an energy absorbing package, wherein the retaining ring and the buckle ring are respectively connected to two ends of the energy-absorbing package.

\* \* \* \* \*